United States Patent
Prior et al.

(10) Patent No.: US 6,811,506 B2
(45) Date of Patent: Nov. 2, 2004

(54) ENGINE ACCESSORY BELT DRIVE WITH SELF-ALIGNING PULLEY

(75) Inventors: Gregory Paul Prior, Birmingham, MI (US); David Geza Kokochak, Oak Park, MI (US); Eric C. Douse, Pontiac, MI (US)

(73) Assignee: General Motors Corporation, Detroit, MI (US)

( * ) Notice: Subject to any disclaimer, the term of this patent is extended or adjusted under 35 U.S.C. 154(b) by 105 days.

(21) Appl. No.: 10/273,062

(22) Filed: Oct. 17, 2002

(65) Prior Publication Data

US 2004/0077445 A1 Apr. 22, 2004

(51) Int. Cl.[7] .............................................. F16H 7/20
(52) U.S. Cl. ..................................... 474/199; 474/148
(58) Field of Search ............................... 474/101, 112, 474/133, 135, 166, 199, 148

(56) References Cited

U.S. PATENT DOCUMENTS

| | | | | |
|---|---|---|---|---|
| 2,279,887 A | * | 4/1942 | Hathorn ....................... 254/398 |
| 2,421,685 A | * | 6/1947 | Crot et al. ................... 384/498 |
| 3,251,235 A | * | 5/1966 | Cederberg et al. ........... 474/123 |
| 4,723,934 A | * | 2/1988 | Thomey ...................... 474/135 |
| 4,747,810 A | * | 5/1988 | Shepley et al. ............. 474/135 |
| 5,616,107 A | * | 4/1997 | Simonson ..................... 482/97 |

* cited by examiner

Primary Examiner—David A. Bucci
Assistant Examiner—Vicky A. Johnson
(74) Attorney, Agent, or Firm—Karl F. Barr, Jr.

(57) ABSTRACT

An engine accessory belt drive includes a self-aligning pulley assembly including a relatively stationary outer assembly and a universally pivotable inner assembly supported by the outer assembly and able to be locked in position by tightening of a fastener. During alignment of the self-aligning pulley with the belt, the fastener is maintained in the loose position, allowing limited universal pivoting of the rotational axis of the pulley as a result of belt tension forces which act to align the pulley. After the pulley is aligned, the fastener is tightened to fix the rotational axis of the pulley and the inner assembly in the aligned position of the pulley. Features of the inner and outer assemblies of the pulley assembly are also described.

13 Claims, 4 Drawing Sheets

ENGINE ACCESSORY BELT DRIVE WITH SELF-ALIGNING PULLEY

TECHNICAL FIELD

This invention relates to a self-aligning pulley and an engine accessory belt drive incorporating such a pulley.

BACKGROUND OF THE INVENTION

It is known in the art to use pulleys and belts to drive automotive engine accessories such as alternators, air conditioning compressors, power steering pumps, and the like. Proper alignment of these pulleys and belts is necessary for the quiet operation of the belt drive. Typically, in volume production, the accessories are all mounted on brackets that have tolerances which can cause misalignment. Short belt spans are more critical than long spans because the belts lack flexibility over short spans to compensate for any misalignment of the pulleys.

SUMMARY OF THE INVENTION

The present invention provides a self-aligning pulley assembly for use in a tensioned belt drive, wherein the pulley may need alignment.

The present invention also provides an engine accessory belt drive which has a self aligning pulley assembly to correct pulley to belt misalignment in the belt drive.

In a preferred embodiment, a self-aligning pulley assembly according to the invention includes a relatively stationary outer assembly and a universally pivotable inner assembly supported by the outer assembly.

The inner assembly includes a pulley for engaging a generally flat belt, a bearing rotatably supporting the pulley on a rotational axis, and support members having convex part-spherical outer surfaces, and inner portions engaging and supporting the bearing.

The outer assembly includes a relatively stationary support, guide members carried by the support and having recessed surfaces engagable with the spherical outer surfaces of the support members, an axle defining a relatively fixed support axis and extending through the guide members and the inner assembly, and a fastener associated with the axle and adjustable between loose and tight positions for, respectively, movably or fixedly holding the recessed surfaces of the guide members against the spherical surfaces of the support members;

During self-alignment of the pulley with a belt, the fastener is maintained in the loose position, allowing limited universal pivoting of the rotational axis of the pulley to self-align the pulley with the direction of motion and tilt of the belt surface. After the pulley is aligned, the fastener is tightened (moved to the tight position) to fix the rotational axis of the pulley and the inner assembly in the aligned position of the pulley.

These and other features and advantages of the invention will be more fully understood from the following description of certain specific embodiments of the invention taken together with the accompanying drawings.

DESCRIPTION OF THE PREFERRED EMBODIMENT

Figure 1:
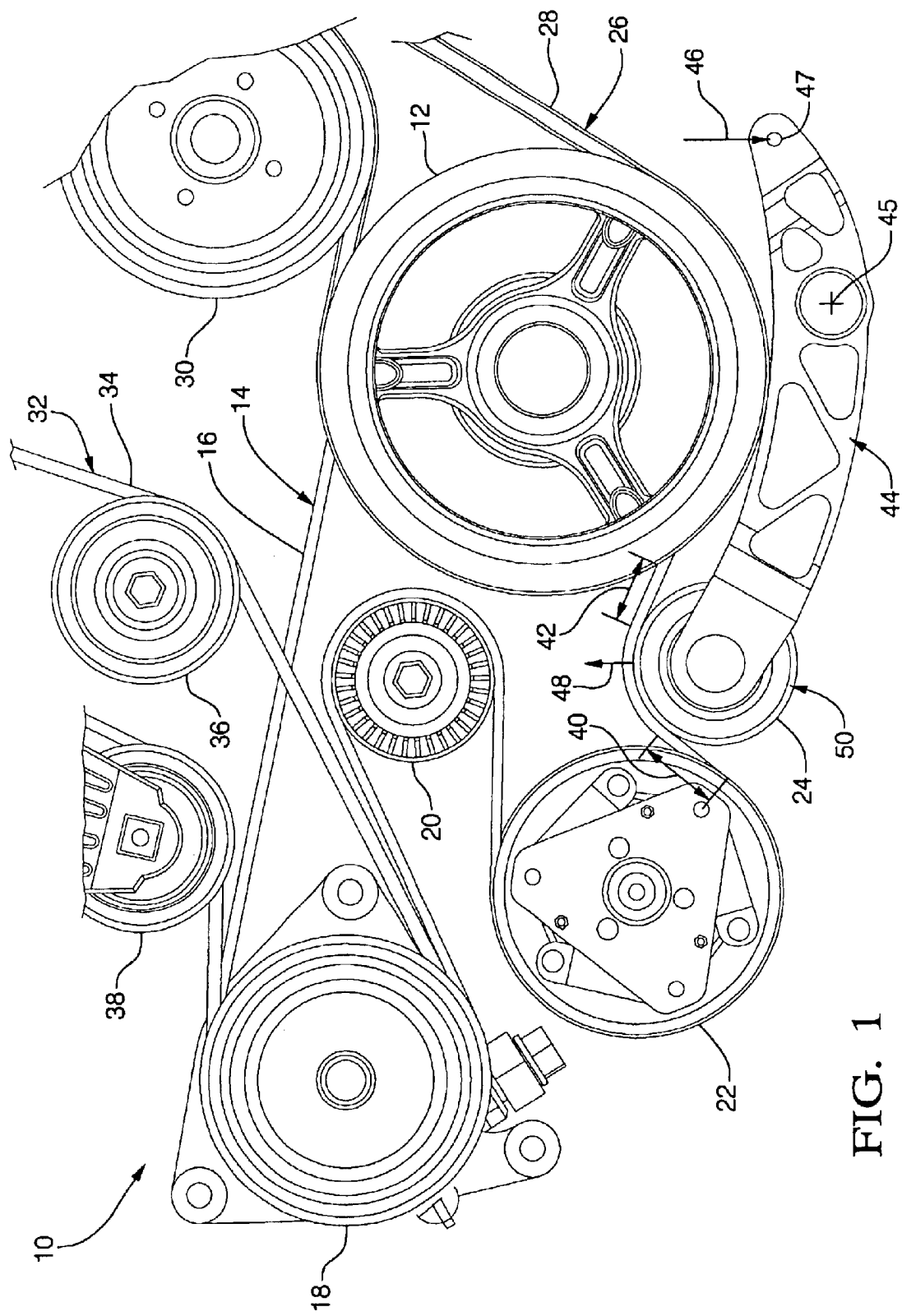
FIG. 1 is a front end view of a portion if an engine accessory belt drive including a self-aligning pulley assembly according to the invention.

Referring first to FIG. 1 of the drawings in detail, numeral 10 generally indicates a front view of a portion of an engine accessory belt drive according to the invention. Drive 10 includes a crank pulley 12 that acts as a main drive pulley for the accessory drive 10. In a first belt run 14, a conventional multigroove first drive belt 16 having a generally flat cross section extends around the crank pulley 12, a power steering pulley 18, a first idler pulley 20, an AC (air conditioning) compressor pulley 22, and a first tensioner pulley 24, back to the crank pulley 12.

In a second belt run 26, a second drive belt 28 extends around a second track of the crank pulley 12 to an alternator pulley, not shown, and back around a water pump pulley 30 to the crank pulley 12. In a third belt run 32, a third drive belt 34 extends around the power steering pulley 18, an idler pulley 36, an additional accessory pulley, not shown, and back around a second tensioner pulley 38 to the power steering pulley 18. The second and third belt runs are illustrated here to show the complex nature of an accessory drive for a modern engine, which requires driving of multiple accessories from the engine crankshaft crank pulley 12.

Referring back to the first belt run 14, it is noted that belt spans between pulleys are relatively long, except for spans designated 40 and 42 which extend between the first tensioner pulley 24 and the AC and crank pulleys 22, 12, which are quite short due to the arrangement of the accessories to be driven by the belt. The short spans 40, 42 have limited flexibility to adjust for misalignment of the tensioner pulley with direction of belt motion and, thus, create the possibility of noise created at the interface of the belt with the tensioner pulley if the pulley is misaligned.

In addition, the first tensioner pulley 24 is rotatably mounted on a tensioner lever 44 which has a pivot axis 45. When a tensioner load 46 is applied upon a first end 47 of the tensioner lever 44, the resulting moment about the pivot axis 45 results in application of a belt tensioning force 48 against the first drive belt 16. As the belt 16 expands or stretches in service, the lever 44 will pivot to take up the slack and may increase the angular engagement of the tensioner pulley 24 with the belt 16, increasing the potential for noise from misalignment of the belt and pulley.

Figure 2:
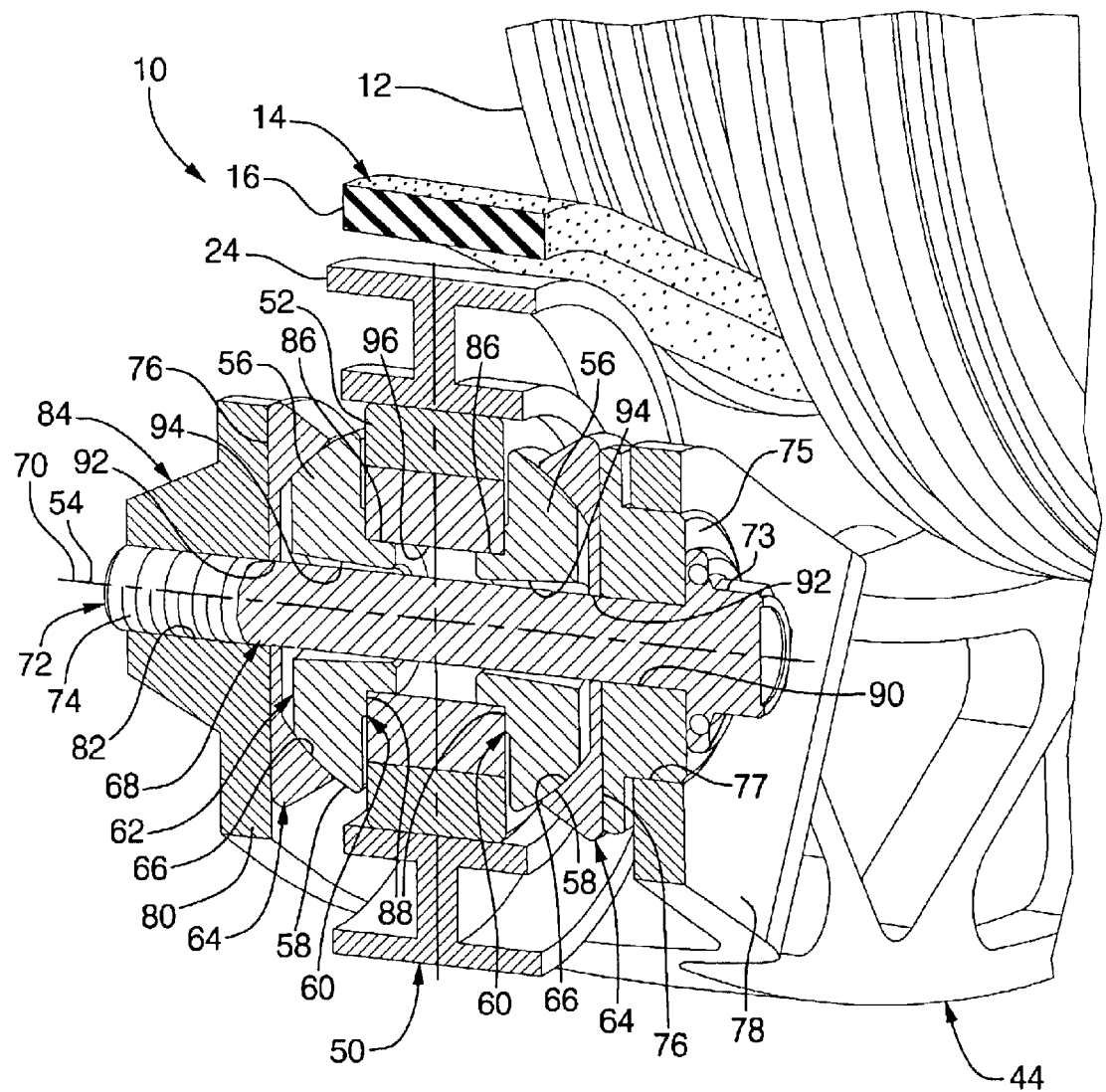
FIG. 2 is a fragmentary isometric view of the drive showing the pulley assembly in cross section prior to alignment.
Figure 3:
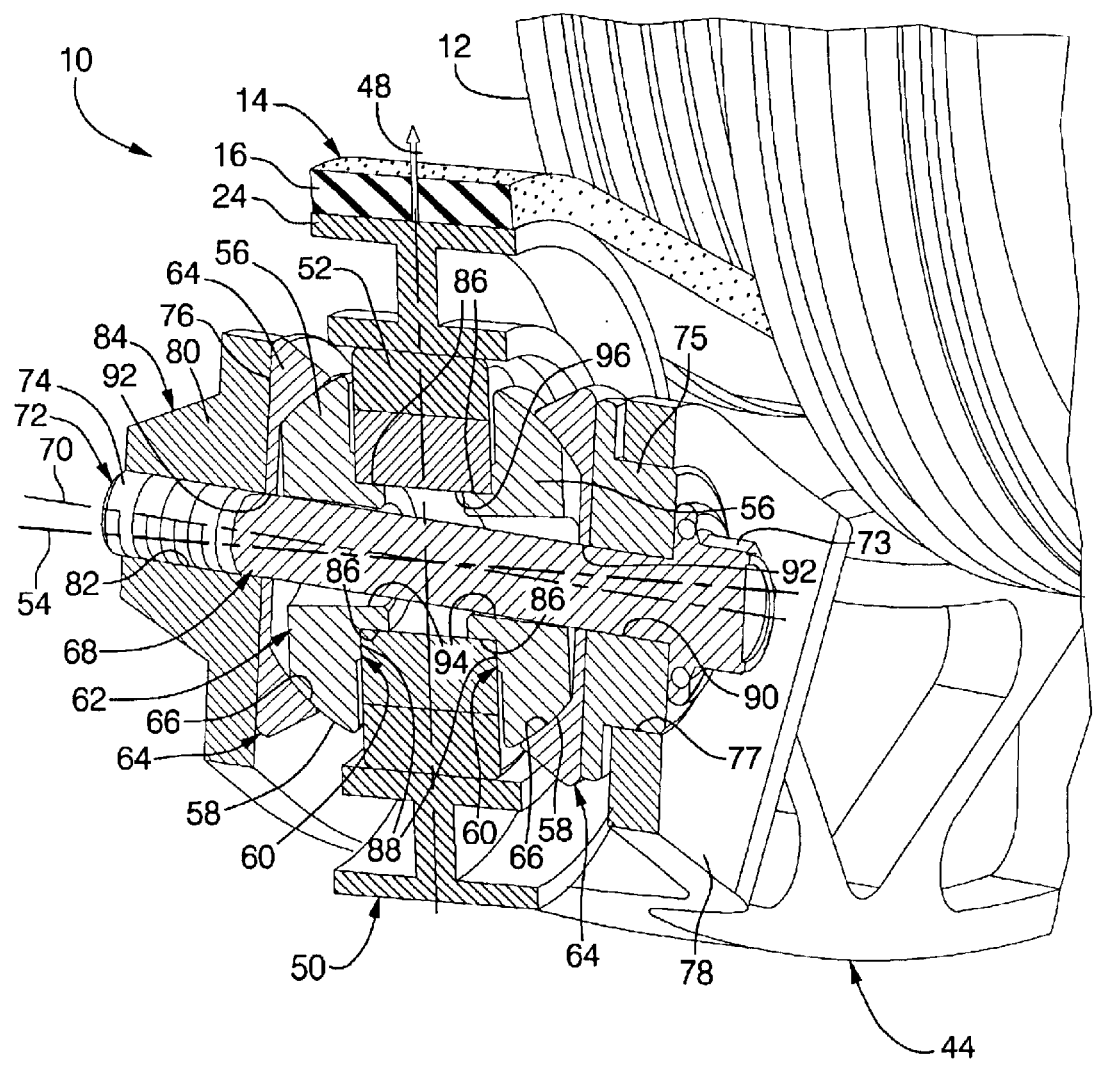
FIG. 3 is a view similar to FIG. 2 but showing the pulley assembly after alignment and tightening of the fastener.
Figure 4:
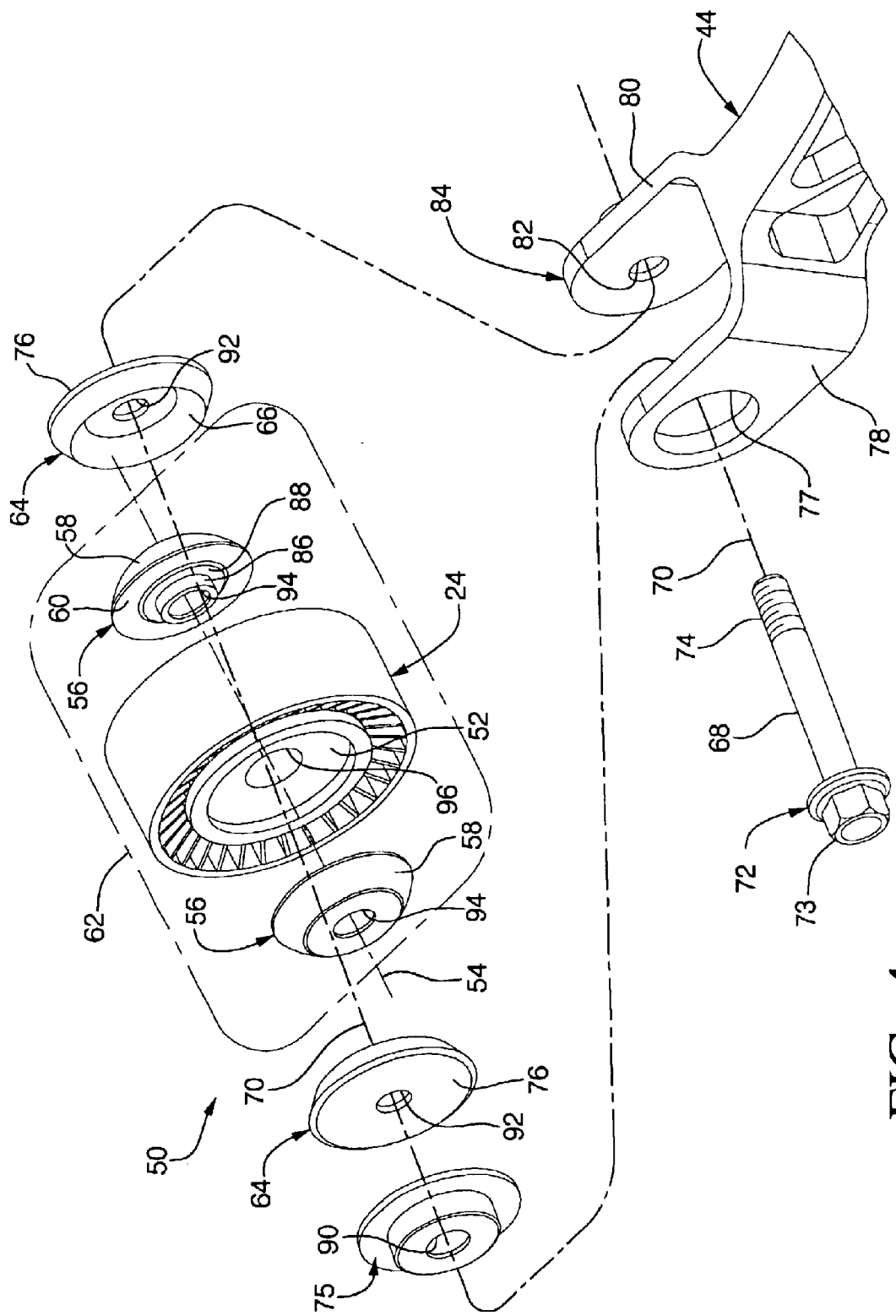
FIG. 4 is an exploded view of the pulley assembly shown in an aligned position.

To avoid the problems which may result from misalignment of the first tensioner pulley 24 and the drive belt 16, the pulley 24 is made part of a self-aligning pulley assembly 50, a preferred embodiment being shown in FIGS. 2–4. In assembly 50, the tensioner pulley 24 is rotatably supported, for engagement with belt 16, by a bearing 52, preferably of the low friction roller or ball type. Other bearing types suitable for a particular application could be utilized, if desired.

Bearing 52 supports the pulley 24 for rotation on a rotational axis 54. The bearing is, in turn, supported by a pair of support members 56. Each support member 56 has a convex part-spherical outer surface 58 and an inner portion 60 engaging and supporting one side of bearing 52. Thus, bearing 52 is supported on both sides by the inner portions 60 of the support members 56. The pulley 24, bearing 52 mounted on rotational axis 54, and the pair of support members 56, together constitute a universally pivotable inner assembly 62.

The pair of support members 56 engage a pair of guide members 64 wherein each guide member 64 has a recessed inner surface 66 engaging the convex part-spherical outer surface 58 of one of the support members 56. The recessed surfaces 66 may be concave part-spherical surfaces, but could have other configurations, such as conical.

An axle 68 defines a support axis 70, which is fixed in relation to the pivotable inner assembly 62 and the rotational axis 54 of the pulley. Axle 68 forms part of a fastener 72 formed as a bolt having a head 73 at one end and an opposite threaded end 74.

A spacer 75 is disposed between an outer face 76 of one of the guide members 64 and the head 73 of the fastener bolt 72. The spacer 75 is received in an opening 77 in an arm 78 of two bifurcated arms 78, 80 that form a support at the pulley end of the tensioner lever 44. The other bifurcated arm 80 includes a threaded opening 82 into which the threaded end 74 of the fastener bolt 72 is received. The support 78, 80, the spacer 75, the guide members 64 and the fastener bolt 72 define a relatively stationary outer assembly 84 fixed in the pulley end of the tensioner lever 44.

In assembly of the self-aligning pulley assembly 50 to the tensioner lever 44, the pivotable inner assembly 62 is first formed. This includes fixing the outer race of bearing 52 within the first idler pulley 24 and inserting the support members 56 against the bearing inner race. The support members 56 engage and support the bearing inner race both radially and axially by cylindrical and radial surfaces 86, 88, respectively, of the support members.

The guide members 64, which form part of the relatively stationary outer assembly, are then placed with their recessed inner surfaces 66 (preferably part spherical) engaging the part spherical convex outer surfaces 58 of the support members 56. The spacer 75 is inserted into the opening 77 in the bifurcated arm 78 of the tensioner lever 44, and the inner assembly 62, together with guide members 64, is slid into position between the bifurcated arms 78, 80 with flat outer faces 76 of the guide members respectively engaging an inner face of the bifurcated arm 80 and an inner face of the spacer 75.

The fastener bolt 72 is then inserted through axially-aligned openings, including an opening 90 in the spacer 75, support openings 92 in the guide members 64, clearance openings 94 in the support members 56 and a central opening 96 in the inner race of bearing 52, and the bolt is threaded into the threaded opening 82 of bifurcated arm 80. At this point, the bolt may be loosely applied so that the inner assembly 62 remains free to pivot in any direction, within limits of the clearance openings 94 in the support members. Thus, the rotational axis 54 of the tensioner pulley 24 may be positioned to be coaxial with or canted at a limited angle with respect to the support axis 70 of the axle 68 formed by the fastener bolt 72.

During assembly of the accessory belt drive 10, the tensioner lever 44 is mounted on its pivot axis 45 and a tensioner loading device, such as a spring or piston not shown, is connected to the first end 47 of the lever 44 for urging the lever 44 clockwise, as seen in FIG. 1, toward the belt tensioning position. The lever is initially retracted with the pulley 24 backed away from its operative position so that the first drive belt 16 may be installed around the other pulleys 12, 18, 20 and 22. The pulley fastener bolt 72 is loosened or remains loose at this time so that the pulley 24 and inner assembly 62 with the rotational axis 54 are free for self-alignment.

When the belt 16 is in place, the tensioner lever 44 is released and the pulley 24 is urged against the smooth back side of the multi-grooved generally flat drive belt 16. The reaction forces of the belt on the tensioner pulley then act to pivot the pulley 24, the inner assembly 62 and the rotational axis 54 into an aligned position of the pulley 24 with the belt 16, thus self-aligning the pulley. Should the tensioner pulley 24 not become fully aligned by a single release of the tensioner lever 44, the lever may be retracted and released a few times to urge the pulley 24 into better alignment. Also, cranking of the engine to move the belt around the pulleys may also be helpful in obtaining better alignment if needed.

When the tensioner pulley 24 is properly aligned, the fastener bolt 72 is then tightened, causing frictional engagement of the convex surfaces 58 of the support members 56 with the recessed or concave surfaces 66 of the guide members 64 to lock the inner assembly 62 in place in the outer assembly 84. The tensioner pulley 24 is thereby fixed in the aligned position against the drive belt 16 so that the operation of the accessory drive 10 may be operated with minimal belt/pulley misalignment.

The structure and method of assembly of the engine accessory drive of the invention thus combine to provide alignment of a tensioner or idler pulley in an accessory belt drive without requiring severe tolerance requirements in the design and manufacture of the mounting components for the particular pulley application involved. The invention is particularly effective in the exemplary application described wherein mounting of the pulley on the end of a pivoting tensioner arm would require close tolerances of the assembled components in order to maintain the degree of alignment of the belt and pulley that is desirable for quiet operation of the accessory drive. This is particularly important in view of the short belt runs indicated in FIG. 1 of the drawings, which make the problems of misalignment more severe than is the case for longer belt runs where flexibility of the belt may be sufficient to accommodate greater degrees of misalignment.

While the axle 68 of the exemplary embodiment described is formed as a fastener bolt 72 supported at both ends, the invention could also be applied to an axle supported at one end as a cantilever beam wherein the fastener could be a nut threaded on the end of the axle.

The use of the term relatively stationary is intended to convey that the outer assembly of the pulley assembly is stationary relative to the inner assembly, which is pivotable. When the outer assembly is mounted on the end of a tensioner lever, the outer and inner assemblies are, of course, movable with the lever, but the outer assembly remains relatively stationary as compared to the pivotable inner assembly.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A self-aligning pulley assembly comprising:

a relatively stationary outer assembly; and a universally pivotable inner assembly supported by the outer assembly;

the inner assembly including a pulley adapted for engaging a belt of generally flat cross section, a bearing rotatably supporting the pulley on a rotational axis, and support members having convex part-spherical outer surfaces and inner portions engaging and supporting the bearing;

the outer assembly including a relatively stationary support, guide members carried by the stationary support and having recessed surfaces engaging the spherical outer surfaces of the support members, an axle defining a relatively fixed support axis and extending through the guide members and the inner assembly, and a fastener associated with the axle and adjustable between loose and tight positions for, respectively, movably or fixedly holding the recessed surfaces of the guide members against the spherical surfaces of the support members;

wherein, during self-alignment of the pulley with a belt of a belt drive, the fastener is maintained in the loose position, allowing limited universal pivoting of the rotational axis of the pulley and, after the pulley is aligned, the fastener is moved to the tight position to fix the rotational axis of the pulley and the inner assembly in the aligned position of the pulley.

2. A self-aligning pulley assembly as in claim 1 wherein the recessed surfaces of the guide members are concave part-spherical surfaces.

3. A self-aligning pulley assembly as in claim 1 wherein the axle is a threaded member forming a part of the fastener.

4. A self-aligning pulley assembly as in claim 3 wherein the axle is a headed member threaded at an opposite end for attachment to the support.

5. A self-aligning pulley assembly as in claim 1 wherein the axle extends through openings in the support members having clearance from the axle to permit tilting of the inner assembly and the rotational axis relative to the support axis.

6. A self-aligning pulley assembly as in claim 1 wherein the inner portions of the support members include cylindrical surfaces and the radial surfaces that engage and support the bearing.

7. An engine accessory belt drive including a tensioned belt of generally flat cross section engaging a self-aligning pulley assembly between two additional pulleys rotatable on generally fixed axes, wherein the self-aligning pulley assembly comprises:

a relatively stationary outer assembly; and a universally pivotable inner assembly supported by the outer assembly;

the inner assembly including a self-aligning pulley engaging the belt, a bearing rotatably supporting the self-aligning pulley on a rotational axis, and support members having convex part-spherical outer surfaces, and inner portions engaging and supporting the bearing;

the outer assembly including a relatively stationary support locating the pulley assembly in the accessory belt drive, guide members carried by the stationary support and having recessed surfaces engaging the part-spherical outer surfaces of the support members, an axle defining a relatively fixed support axis and extending through the guide members and the inner assembly, and a fastener associated with the axle and adjustable between loose and tight positions for, respectively, movably or fixedly holding the recessed surfaces of the guide members against the part-spherical surfaces of the support members;

wherein, during alignment of the self-aligning pulley with the belt, the fastener is maintained in the loose position, allowing limited universal pivoting of the rotational axis of the pulley and, after the pulley is aligned, the fastener is moved to the tight position to fix the rotational axis of the pulley and the inner assembly in the aligned position of the pulley.

8. An engine accessory belt drive as in claim 7 wherein the relatively stationary support is a movable portion of a belt tensioner.

9. An engine accessory belt drive as in claim 7 wherein the stationary support is part of a tensioner lever.

10. An engine accessory belt drive as in claim 7 wherein the recessed surfaces of the guide members are concave part-spherical surfaces.

11. An engine accessory belt drive as in claim 7, wherein the axle is a threaded member forming a part of the fastener.

12. An engine accessory belt drive as in claim 7, wherein:

the stationary support includes bifurcated arms receiving the self-aligning pulley assembly therebetween;

the axle is a headed member threaded at an opposite end that engages a threaded opening in one of the arms and operatively engages a spacer disposed in a support opening in another of the arms and aligned on the support axis;

whereby rotation of the headed member is operative to adjust the fastener between the loose and tight positions and respectively allow or prevent tilting of the rotational axis of the pulley for alignment of the self-aligning pulley with the belt running between the two additional pulleys.

13. An engine accessory belt drive as in claim 7 wherein the inner portions of the support members include cylindrical surfaces and the radial surfaces that engage and support the bearing.

* * * * *